(12) United States Patent
Gandhi et al.

(10) Patent No.: US 10,124,840 B2
(45) Date of Patent: Nov. 13, 2018

(54) DEPLOYABLE VEHICLE AIR DRAG REDUCTION MECHANISM AND SYSTEM

(71) Applicant: Toyota Motor Engineering & Manufacturing North America, Inc., Erlanger, KY (US)

(72) Inventors: Umesh N. Gandhi, Farmington Hills, MI (US); Yasuo Uehara, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/298,242

(22) Filed: Oct. 20, 2016

(65) Prior Publication Data
US 2018/0111649 A1    Apr. 26, 2018

(51) Int. Cl.
*B60J 9/00* (2006.01)
*B62D 35/00* (2006.01)

(52) U.S. Cl.
CPC ...... *B62D 35/007* (2013.01); *B60Y 2400/408* (2013.01)

(58) Field of Classification Search
CPC .... B62D 35/001; B62D 35/004; B29C 41/22; B29C 66/71; F01D 11/24; H01L 2924/0002; H01L 2924/00; D07B 2801/24; B01D 17/00; B01D 21/0003
USPC ..................................................... 296/180.1
See application file for complete search history.

(56) References Cited

U.S. PATENT DOCUMENTS

| | | | | |
|---|---|---|---|---|
| 2,737,411 A | * | 3/1956 | Potter | B62D 35/004 244/130 |
| 4,142,755 A | * | 3/1979 | Keedy | B62D 35/001 296/180.2 |
| 4,257,641 A | * | 3/1981 | Keedy | B62D 35/001 296/180.4 |
| 4,458,936 A | * | 7/1984 | Mulholland | B62D 35/001 296/180.4 |
| 4,508,380 A | * | 4/1985 | Sankrithi | B62D 35/001 105/1.1 |
| 4,601,508 A | * | 7/1986 | Kerian | B62D 35/004 180/119 |
| 4,978,162 A | * | 12/1990 | Labbe | B62D 35/004 296/180.2 |

(Continued)

OTHER PUBLICATIONS

Collapsible Cup, "Aerostitch Equipment for Riders", Retrieved from the Internet: <http://www.aerostich.com/collapsible-cup.html>, Retrieved Oct. 18, 2016, 2 pages.

*Primary Examiner* — Kiran B Patel
(74) *Attorney, Agent, or Firm* — Christopher G. Darrow; Darrow Mustafa PC (57) ABSTRACT

An air-drag reduction mechanism for a vehicle is provided. The mechanism includes a shell structured to be deployable in a direction away from a vehicle, the shell including a plurality of telescoping shell segments. The shell segments are structured to form a shell having a shape which tapers or narrows in a direction away from the vehicle. The air-drag reduction mechanism may be incorporated into an air-drag reduction system including an actuation mechanism operatively coupled to the telescoping shell and operable to deploy the shell.

12 Claims, 10 Drawing Sheets

(56) References Cited

U.S. PATENT DOCUMENTS

| | | | | |
|---|---|---|---|---|
| 5,058,945 A * | 10/1991 | Elliott, Sr. | ............ | B62D 35/001 296/180.1 |
| 5,236,347 A * | 8/1993 | Andrus | ................ | B62D 35/004 296/180.4 |
| 5,498,059 A * | 3/1996 | Switlik | ................ | B62D 35/001 296/180.1 |
| 6,092,861 A * | 7/2000 | Whelan | ................ | B62D 35/001 296/180.2 |
| 6,309,010 B1 * | 10/2001 | Whitten | ............... | B62D 35/001 296/180.1 |
| 6,409,252 B1 * | 6/2002 | Andrus | ................ | B62D 35/004 296/180.1 |
| 6,467,833 B1 * | 10/2002 | Travers | ................ | B62D 35/004 296/180.1 |
| 6,789,839 B1 | 9/2004 | Samuelson | | |
| 6,799,791 B2 * | 10/2004 | Reiman | ................ | B62D 35/004 296/180.1 |
| 7,374,230 B2 * | 5/2008 | Breidenbach | ........ | B62D 35/001 296/180.1 |
| 7,380,868 B2 * | 6/2008 | Breidenbach | ........ | B62D 35/001 296/180.1 |
| 7,618,086 B2 * | 11/2009 | Breidenbach | ........ | B62D 35/007 296/180.1 |
| 7,726,724 B2 * | 6/2010 | Kohls | ................ | B62D 35/001 296/180.1 |
| 7,740,304 B1 * | 6/2010 | Breu | ................... | B62D 35/001 296/180.1 |
| 7,854,468 B2 * | 12/2010 | Vogel | ................... | B62D 35/001 296/180.1 |
| 7,857,376 B2 * | 12/2010 | Breidenbach | ........ | B62D 35/001 296/180.1 |
| 8,100,461 B2 * | 1/2012 | Smith | ................. | B62D 35/001 296/180.4 |
| 8,360,509 B2 * | 1/2013 | Smith | ................. | B62D 35/001 296/180.4 |
| 9,051,013 B1 * | 6/2015 | Popa | ................... | B62D 35/004 |
| 9,371,097 B1 * | 6/2016 | Conny | ................ | B62D 35/004 |
| 9,815,507 B2 * | 11/2017 | Breidenbach | ........ | B62D 35/007 |
| 2006/0273625 A1 * | 12/2006 | Andrus | ................ | B62D 35/004 296/180.1 |
| 2007/0089531 A1 * | 4/2007 | Wood | ................... | B62D 35/001 73/861.22 |
| 2007/0176465 A1 * | 8/2007 | Wood | ................... | B62D 35/001 296/180.4 |
| 2008/0303310 A1 * | 12/2008 | Breidenbach | ........ | B62D 35/001 296/180.2 |
| 2009/0026797 A1 * | 1/2009 | Wood | ................... | B62D 35/001 296/180.1 |
| 2009/0236872 A1 * | 9/2009 | Wood | ................... | B62D 35/001 296/180.1 |
| 2009/0256386 A1 * | 10/2009 | Wood | ................... | B62D 35/001 296/180.1 |
| 2011/0101730 A1 * | 5/2011 | Tertnes | ................ | B62D 35/001 296/180.4 |

\* cited by examiner

DEPLOYABLE VEHICLE AIR DRAG REDUCTION MECHANISM AND SYSTEM

TECHNICAL FIELD

The present invention relates to structures designed to increase the aerodynamic efficiency of a moving vehicle.

BACKGROUND

As vehicle road speed increases, the air drag on a moving vehicle may increase. Various features may be added to the vehicle reduce air turbulence and to increase the aerodynamic efficiency of a moving vehicle, especially a vehicle moving at a relatively high speed. For example, airfoils or other features may be attached to the vehicle exterior to smooth airflow over and around the vehicle. Various characteristics of the overall vehicle body shape may be tailored to reduce drag (for example, through the rounding or elimination of sharp edges). However, these mitigation measures may have only relatively small effects on drag.

SUMMARY

In one aspect of the embodiments described herein, an air-drag reduction mechanism for a vehicle is provided. The mechanism includes a shell structured to be deployable in a direction away from a vehicle. The shell includes a plurality of telescoping shell segments.

In another aspect of the embodiments described herein, a deployable air-drag reduction system is provided. The system includes a shell having a plurality of telescoping shell segments. The shell is structured to be deployable in a direction away from a vehicle. The system also includes an actuation mechanism operatively coupled to the telescoping shell and operable to deploy the shell.

In another aspect of the embodiments described herein, a method of reducing air-drag on a vehicle is provided. The method includes the step of deploying, in a direction away from the vehicle, a tapering shell attached to a rear of the vehicle and formed from a plurality of telescoping shell segments.

DETAILED DESCRIPTION

Embodiments of the air-drag reduction mechanism described herein reduce vehicle air drag by increasing the length-to-width ratio of the vehicle through deployment of a tapering tail structure from the rear of the vehicle. The tail structure is in the form of a shell attached to the rear of the vehicle and which narrows or tapers in a rearward direction of the vehicle. A computing or control system of the vehicle may be configured to deploy the tail structure automatically when the vehicle road speed reaches or exceeds a predetermined threshold. The computing or control system may also be configured to retract the tail structure automatically when the vehicle road speed falls below the predetermined threshold. Alternatively, the tail structure may be manually deployable and/or retractable.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
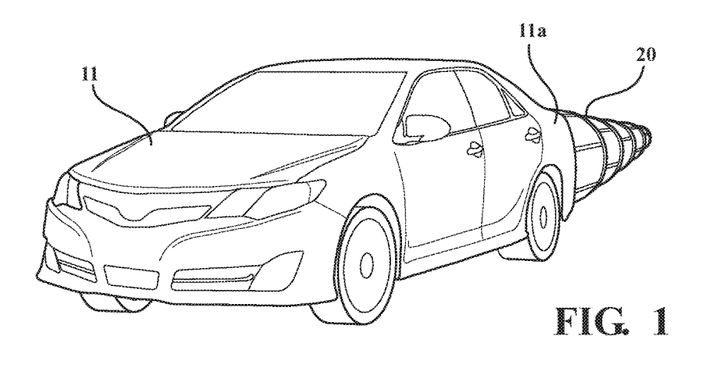
FIG. 1 is a schematic perspective view of a vehicle incorporating an embodiment of an air-drag reduction mechanism in the form of a shell deployed from a rear of the vehicle.

FIG. 1 is a schematic perspective view of a vehicle 11 incorporating an embodiment of an air-drag reduction mechanism. FIG. 1 shows the air-drag reduction mechanism in a deployed condition. In the embodiment shown in FIG. 1, the air-drag reduction mechanism is in the form of a tapering shell 20 which is structured to be deployable from the vehicle 11, in a direction away from the vehicle. In the embodiment shown in FIG. 1, the shell 20 is coupled to and deployable from a rear end 11a of a vehicle 11. However, other embodiments of an air-drag reduction mechanism may be coupled to a front end of the vehicle (or to another portion of the vehicle) for deployment therefrom.

In embodiments described herein, the shell 20 may be shaped and dimensioned such that, when deployed, the shell reduces vehicle air drag during operation of the vehicle, especially at relatively higher road speeds (i.e., the air drag of the vehicle is less with the shell deployed than it would be with the shell retracted or without the shell). Also, in certain embodiments, the shell 20 may be retracted when not in use.

Figure 2:
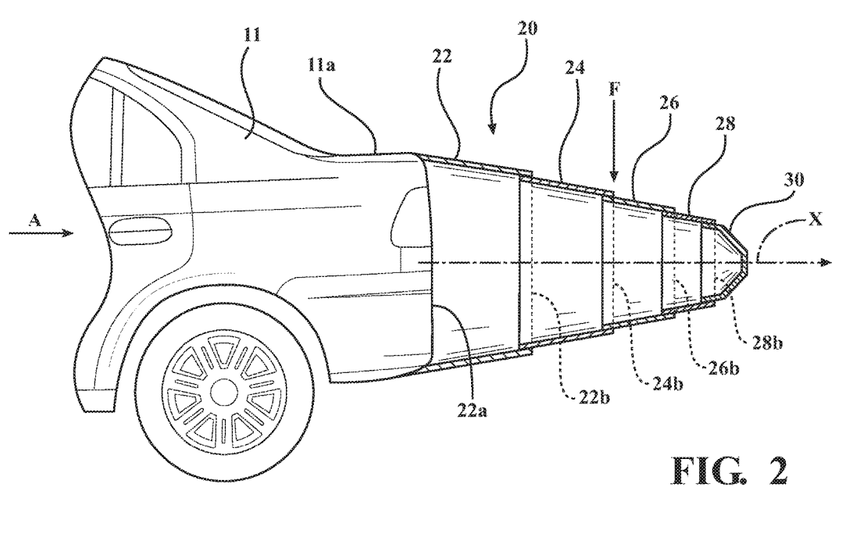
FIG. 2 is a schematic cross-sectional view of the deployed shell embodiment shown in FIG. 1.
Figure 3:
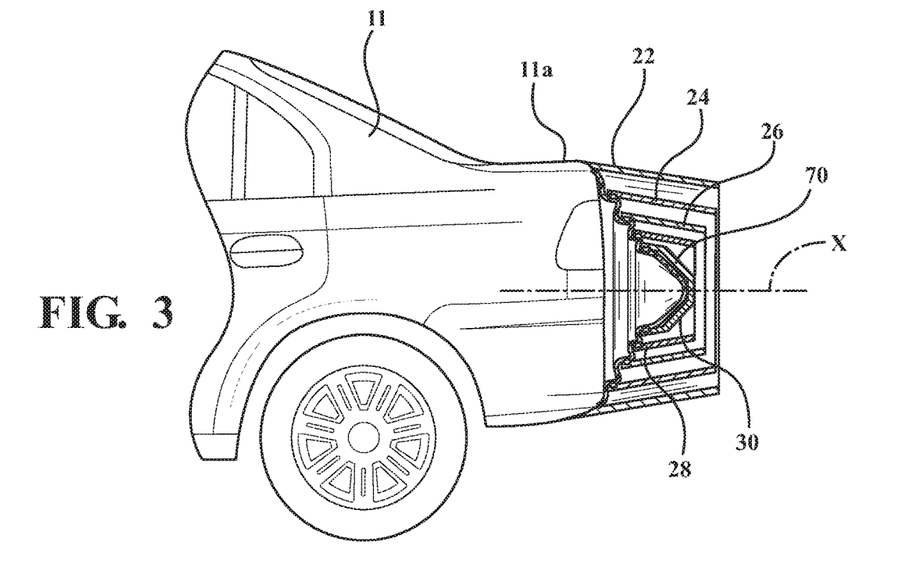
FIG. 3 is a schematic cross-sectional view of the shell embodiment of FIG. 1 shown in a retracted or stowed condition, and also shown with an example of an inflatable bladder usable for deploying the shell.

One possible overall shape of the deployed shell 20 is shown in FIGS. 1 and 2. FIG. 2 is a schematic cross-sectional view of the deployed shell embodiment 20 shown in FIG. 1. FIG. 3 is a schematic cross-sectional view of the shell embodiment 20 of FIG. 1, shown in a retracted or stowed condition. In the embodiment of FIGS. 1 and 2, the overall deployed shape of the shell 20 is generally conical, and the shell 20 is formed using a series of frusto-conically shaped segments connected as described in greater detail below. A frusto-conical shape may be defined as the shape of a basal part of a cone or pyramid formed by cutting off the top by a plane parallel to the base. Other overall shapes suitable for the purposes described herein and producible using the materials and methods described herein may also be used. Designs of various shapes suitable for the purposes described herein and producible using materials and methods as described herein may be determined analytically and/or iteratively using known methods.

The shell embodiments described herein may be formed from a first plurality of connected, telescoping shell segments. In the embodiment shown in FIGS. 1-3, the shell 20 is formed from a plurality of telescoping shell segments 22, 24, 26, 28, and 30. FIGS. 2 and 3 illustrate the telescoping structure of the shell 20. As seen in FIG. 3, each shell segment (except for the end shell segment 30) is structured to receive therein an adjacent shell segment when the shell 20 is in the retracted condition. Stated another way, each shell segment of the plurality of shell segments (except the connecting shell segment 22) is configured to be positionable within an adjacent shell segment of the plurality of telescoping shell segments when the shell 20 is retracted. Thus, when retracted, the entire shell structure may fit within a connecting shell segment 22 (described below). Deployment of the shell 20 causes the structure to expand generally rearwardly of the vehicle (in direction "A" of FIG. 2) along a deployment axis X, so that each shell segment contained within an adjacent shell segment is forced to extend rearwardly from an opening of the adjacent segment until the shell 20 is fully deployed.

Each shell segment forming an embodiment of a shell as described herein may be generally classified as one of a connecting shell segment, an intermediate shell segment, and an end shell segment. A connecting shell segment may be a shell segment such as segment 22 of FIGS. 2-5 (described in greater detail below) structured for direct attachment to the vehicle 11, and which connects the telescoping shell 20 to the vehicle 11. An end shell segment may be a shell segment such as segment 30 which forms an end of the shell 20 when the shell is deployed. An intermediate shell segment may be a shell segment such as any one of shell segments 24, 26, 28 located between connecting shell segment 22 and end shell segment 30.

Figure 4:
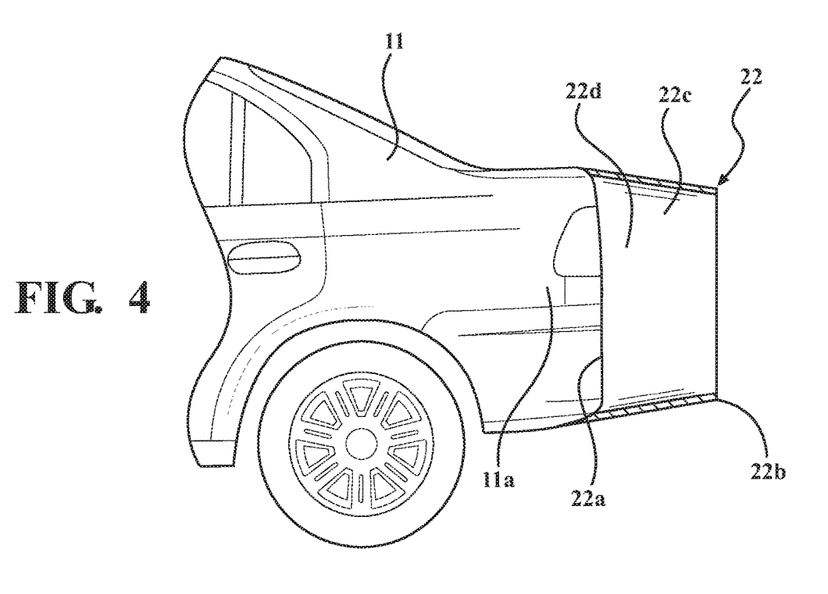
FIG. 4 is a schematic cross-sectional side view of a connecting shell segment attached to the rear end of a vehicle.
Figure 5:
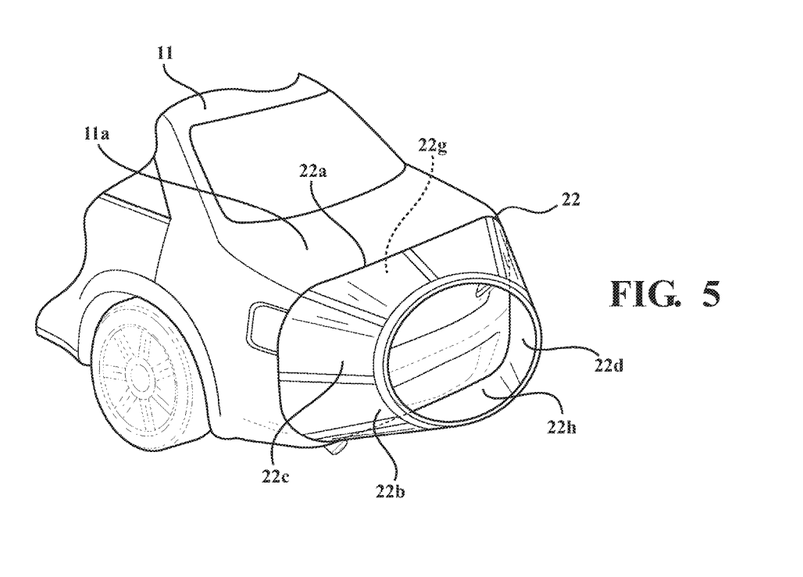
FIG. 5 is a schematic perspective view of the connecting shell segment extending from the vehicle rear end of FIG. 4.

FIG. 4 shows a schematic cross-sectional side view of a connecting shell segment 22 attached to the rear end 11a of a vehicle 11. FIG. 5 shows a perspective view of the connecting shell segment 22 and vehicle rear end of FIG. 4. In the embodiment shown in FIGS. 2-5, the connecting shell segment 22 has a first end 22a, a second end 22b opposite the first end, and at least one wall portion 22c extending between and connecting first and second ends 22a and 22b. Ends 22a and 22b and wall portion(s) 22c define an interior 22d of the connecting shell segment 22. In addition, first end 22a defines a first opening 22g leading into interior 22d, and second end 22b defines a second opening 22h leading into interior 22d. The connecting shell segment 22 is attached to the vehicle 11 and serves as an interface for connecting the shell 20 to the vehicle 11, and also serves as a base in which the remaining segments of the shell 20 may be contained between deployments of the shell. For these purposes, as shown in FIGS. 4 and 5, the connecting shell segment first end 22a may have a shape which is structured to match or blend with the exterior surfaces of the end 11a of the vehicle 11 to which the shell 20 is to be attached. This smoothes the structural transition between the vehicle and the connecting segment, thereby promoting aerodynamic efficiency. Thus, the particular shape of the connecting shell segment 22 first end 22a and first opening 22g may vary with the configuration of the end 11a of the vehicle 11 to which the connecting shell segment 22 is to be attached. The connecting shell segment 22 structure may then taper or otherwise change along wall portion(s) 22c into a shape enabling the remaining segments of the shell to telescope within the connecting shell segment 22. For example, in the embodiment shown in FIGS. 1-5, the shape of the connecting shell segment 22 would change in a rearward direction of the vehicle, from the shape at first end 22a needed to blend with the vehicle end contour, to the circular shape at second end 22b needed to accommodate telescoping of the frusto-conical shell segments 24, 25, and 26 and end shell segment 30. In certain embodiments, the shells described herein may be formed using as few segments as required to provide a desired overall shape and/or length. This may enhance shell rigidity and resistance to deflection responsive to lateral or side loading.

Figure 6:
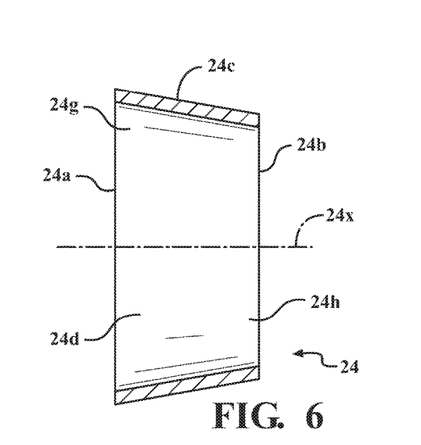
FIG. 6 is a schematic cross-sectional view of one embodiment of an intermediate shell segment in accordance with an embodiment described herein.

FIG. 6 is a schematic cross-sectional view of one embodiment of an intermediate shell segment 24 in accordance with an embodiment described herein, and as may be incorporated into the shell embodiment 20 of FIGS. 1-3. In the embodiment shown in FIGS. 1-3, intermediate shell segments 24, 26, and 28 and end shell segment 30 are generally frusto-conical in shape. However, the intermediate shell segments and end shell segment may have any shapes suitable for a particular application.

In the embodiment shown in FIG. 6, shell segment 24 has a first end 24a, a second end 24b opposite the first end, and at least one wall portion 24c extending between and connecting first and second ends 24a and 24b. Ends 24a and 24b and wall portion(s) 24c define an interior 24d of the shell segment 24. Shell segment 24 may also have a central axis 24x. In the embodiment shown in FIG. 6, the shell segment 24 has a single, frusto-conical wall portion 24c which has a circular cross-sectional shape along the entire length of the shell segment. However, the wall portion(s) 24c may be structured to form any desired cross-sectional shape, depending on the requirements of a particular application. In addition, first end 24a defines a first opening 24g leading into interior 24d, and second end 24b defines a second opening 24h leading into interior 24d.

Figure 7:
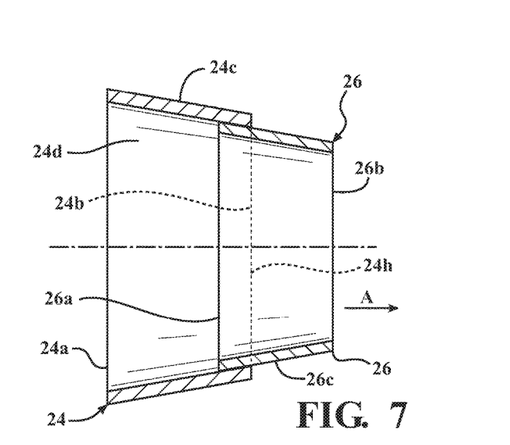
FIG. 7 is a schematic cross-sectional view showing a pair of deployed adjacent telescoping intermediate shell segments in accordance with one embodiment of the shell 20.

FIG. 7 is a schematic cross-sectional view showing a pair of adjacent telescoping intermediate shell segments 24 and 26 in accordance with one embodiment of the shell 20, in a deployed condition. In the embodiment shown, shell segment 26 has the same general shape and characteristics as shell segment 24 described above. However, shell segment 26 is sized to fit within the interior 24d of shell segment 24 when the shell 20 is stowed or retracted. As seen in FIG. 7, a diameter of the first end 26a of shell segment 26 is larger than opening 24h of shell segment 24. This prevents the shell segment 26 from exiting the second end 24b of the shell segment 24. Shell segments 22, 28 and 30 seen in FIGS. 2 and 3 may be structured in a manner similar to that just described, to connect all of the shell segments in a telescoping manner. Particular dimensions of a given shell and/or segment may depend on the desired length of the deployed shell and other pertinent factors.

Referring again to FIGS. 2 and 3, each telescoping shell segment of shell 20 is structured and dimensioned so as to be deployable from one end of an adjacent shell segment in which it is stowed prior to deployment. For example, intermediate shell segment 24 is stowed within connecting shell segment 22 prior to deployment. Intermediate shell segment 24 is also structured and dimensioned for deployment from a connecting shell segment second end 22b. Similarly, intermediate shell segment 26 is stowed within intermediate shell segment 24 prior to deployment, and is structured and dimensioned for deployment from an intermediate shell segment second end 24b. Similarly, intermediate shell segment 28 is stowed within intermediate shell segment 26 prior to deployment, and is structured and dimensioned for deployment from an intermediate shell segment second end 26b. Also, end shell segment 30 is stowed within intermediate shell segment 28 prior to deployment, and is structured and dimensioned for deployment from an intermediate shell segment second end 28b.

The shell segments described herein may be formed from any suitable material or materials. In one embodiment, one or more shell segments are formed from a material having a relatively high stiffness. For example, shell segments may be formed from metallic materials or from polymeric materials such as a carbon fiber-reinforced polymer.

Figure 8A:
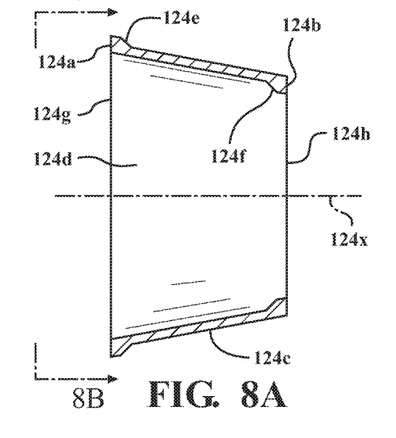
FIG. 8A is a schematic cross-sectional view of an exemplary intermediate shell segment in accordance with another embodiment described herein.
Figure 8B:
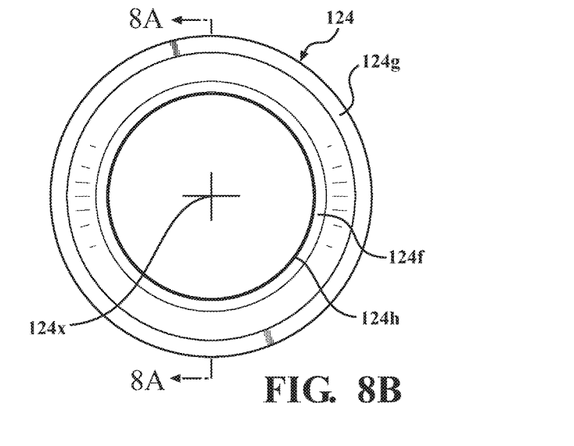
FIG. 8B is an end view of the intermediate shell segment shown in FIG. 8A.

FIG. 8A is a schematic cross-sectional view of an exemplary intermediate shell segment 124 in accordance with another embodiment described herein. FIG. 8b is an end view of the intermediate shell segment 124 shown in FIG. 8A. Shell segment 124 is similar to shell segment 24 previously described. In the embodiment shown in FIG. 8A, shell segment 124 has a first end 124a, a second end 124b opposite the first end, and at least one wall portion 124c extending between and connecting first and second ends 124a and 124b. Ends 124a and 124b and wall portion(s) 124c define an interior 124d of the shell segment 124. Shell segment 124 may also have a central axis 124x. In the embodiment shown in FIGS. 8A and 8B, the shell segment 124 has a single, frusto-conical wall portion 124c which has a circular cross-sectional shape all along the length of the segment between the retention surfaces 124e and 124f (described below). However, the wall portion 124c may be structured to form any desired cross-sectional shape, depending on the requirements of a particular application. In addition, first end 124a defines a first opening 124g leading into interior 124d, and second end 124b defines a second opening 124h leading into interior 124d.

Shell segment first end 124a has a first retention surface 124e formed along an exterior surface of the shell segment 124 and extending generally outwardly from wall portion(s) 124c, in a direction away from interior 124d and also away from central axis 124x. Also, shell segment second end 124b has a second retention surface 124f formed along an interior surface of the shell segment 124 and extending generally inwardly from wall portion(s) 124c, in a direction toward interior 124d and also toward the central axis 124x.

Any of the retention surfaces described herein may extend continuously along the surface of the shell segment on which they are located, for example in the form of a continuous shoulder. Alternatively, any of the retention surfaces may extend along only a portion of the shell segment surface. In addition, multiple separate retention surfaces may be provided at angularly spaced-apart locations along the surface of the shell segment on which they are located.

Figure 9:
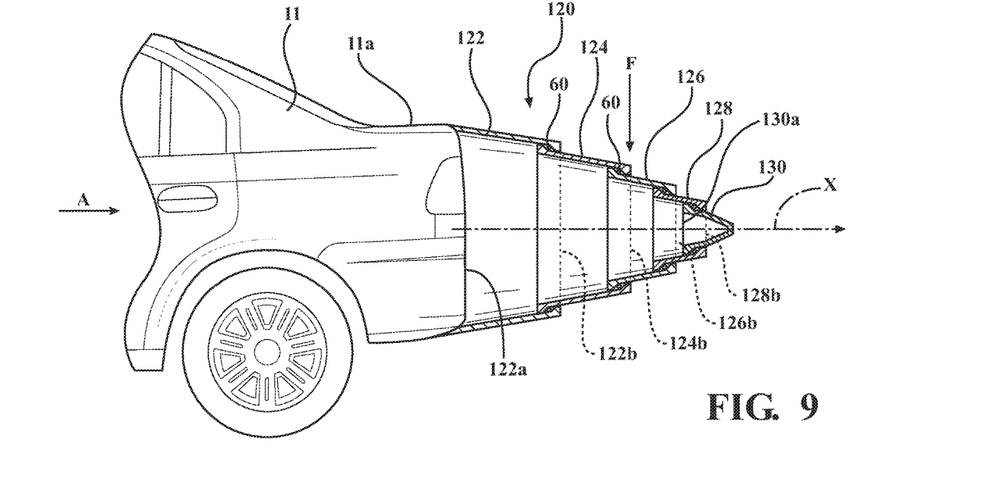
FIG. 9 is a schematic cross-sectional view of another embodiment of a shell similar to the shell shown in FIGS. 1-3.
Figure 10A:
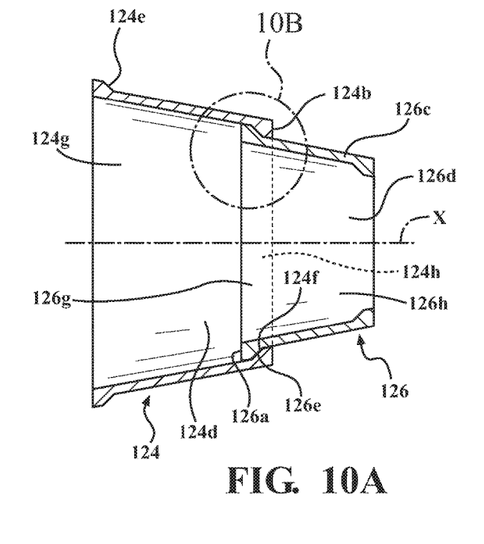
FIG. 10A is a schematic cross-sectional view showing an pair of adjacent telescoping intermediate shell segments in a deployed condition, in accordance with one embodiment of the invention.
Figure 10B:
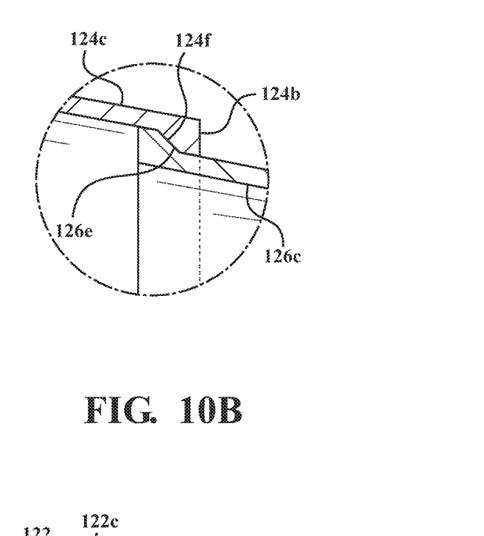
FIG. 10B is a magnified schematic cross-sectional view of portions of the shell segments shown in FIG. 10A.

FIG. 10A is a schematic cross-sectional view showing an pair of adjacent telescoping intermediate shell segments 124 and 126 in a deployed condition, in accordance with one embodiment of the invention. In the embodiment shown, shell segment 126 has the same general shape and characteristics as shell segment 124 described above. However, shell segment 126 is sized to fit within the interior 124d of shell segment 124 when the shell 120 (shown in FIG. 9) in which they are incorporated is stowed or retracted, in the manner previously described with respect to shell segments 24 and 26. FIG. 10B is a magnified schematic cross-sectional view of portions of the shell segments 124 and 126 shown in FIG. 10A. Shell segments 124 and 126 have retention surfaces at each end as previously described with regard to shell segment 124. More specifically, shell segment 126 has a retention surface 126e at a first end 126a thereof, and shell segment 124 has a retention surface 124f at a second end 124b of the shell segment. As seen in FIGS. 10A and 10B, retention surface 126e on the first end 126a of shell segment 126 may be positioned within the interior 124d of the shell segment 124 and may be structured to contact the retention surface 124f of shell segment second end 124b when the shell 120 is in a deployed condition. Contact between the retention surfaces 124f and 126e when the shell 120 is in a deployed condition acts as a retention mechanism to prevent the shell segment 126 from exiting and detaching from the second end 124b of shell segment 124 during shell deployment. This structural arrangement of retention surfaces may be used to connect each pair of adjacent telescoping segments described herein. This allows each segment to move into and out of the interior of a relatively larger, adjacent segment during deployment and retraction, without the adjacent segments becoming disconnected. In addition, use of the retention surfaces as described above facilitates incorporation of a stiffening mechanism (described in greater detail below) into the shell. Alternative forms of retention surfaces or alternative retention mechanisms may also be used.

Any pair of adjacent shell segments may incorporate opposed retention surfaces as just described. In addition, all of the shell segments of a given shell may incorporate opposed retention surfaces as just described. For example, FIG. 9 is a schematic cross-sectional view of a shell 120 similar to shell 20 of FIGS. 1-3. The description of shell embodiment 20 set forth previously may be applied to shell embodiment 120, except with regard to any differences noted (for example, the use of retention surfaces at the ends of the shell segments of shell 120, and the use of stiffening mechanisms 60 (described below) in shell 120). For example, the wall portions of the shell segments between the retention surfaces of the segments may be frusto-conical in shape, similar to the wall segments of the shell 20 previously described. The shell 120 may also be formed from a first plurality of connected, telescoping segments, with shell 120 formed from telescoping shell segments 122, 124, 126, 128, and 130. Also, shell embodiments 20 and 120 described herein may be operated to deploy and retract in a similar manner.

Shell 120 has shell segments 122, 124, 126, 128, and 130, similar to shell segments 22, 24, 26, 28 and 30 previously described, with connecting shell segment 122, intermediate shell segments 124, 126, and 128, and end shell segment 130. However, adjacent ends of any of shell segments 122, 124, 126, 128, and 130 may be configured with retention surfaces as described above in order to help maintain connection between the shell segment and an adjacent shell segment and facilitate incorporation and operation of one or more stiffening mechanisms. For example, each of intermediate shell segments 124, 126, and 128 may be configured at both ends thereof with retention surfaces as described above, to help maintain connection between the intermediate shell segments, connection between intermediate shell segment 124 and connecting shell segment 122, and connection between intermediate shell segment 128 and end shell segment 30 when the telescoping shell is deployed.

Figure 11A:
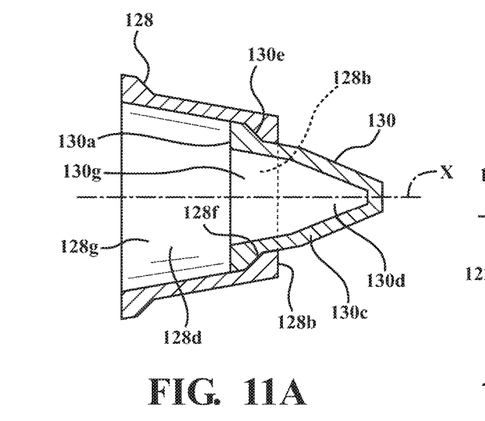
FIG. 11A is a schematic cross-sectional view showing another pair of adjacent telescoping shell segments in a deployed condition, in accordance with one embodiment of the invention.
Figure 11B:
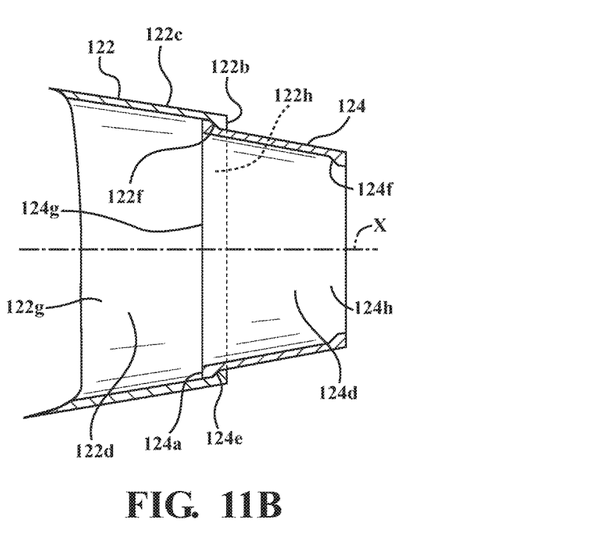
FIG. 11B is a schematic cross-sectional view showing yet another pair of adjacent telescoping shell segments in a deployed condition, in accordance with one embodiment of the invention.

Referring to FIG. 11A, end shell segment 130 of shell 120 is coupled to intermediate shell segment 128. Since only a first end 130a of end shell segment 130 contacts an adjacent shell segment during deployment, a first end 130a of end shell segment 130 may incorporate a retention surface 130e formed therealong and extending generally outwardly from wall portion(s) 130c, in a direction away from an interior 130d of the end shell segment 130 as previously described. Retention surface 130e may be structured to contact a retention surface 128f of intermediate shell segment 128 when the shell 120 is deployed. Similarly, referring to FIG. 11B, since only a second end 122b of connecting shell segment 122 is in contact with an adjacent shell segment 124 during deployment, second end 122b of connecting shell segment 122 may incorporate a retention surface 122f formed therealong and extending generally inwardly from wall portion(s) 122c, in a direction toward an interior 122d of the connecting shell segment 122, as previously described. Retention surface 122f may be structured to contact retention surface 124e of intermediate shell segment 124 when the shell 120 is deployed.

Referring now to FIGS. 12A-12B and 13A-13B, in certain embodiments, a shell in accordance with an embodiment described herein may also incorporate at least one stiffening mechanism. The stiffening mechanism may be structured to increase the rigidity and resistance to deflection of the deployed shell to a force applied laterally to the shell (for example, a force such as force F shown in FIG. 9). For this purpose, the stiffening mechanism may be structured for increasing resistance to deflection of the shell 120 at a junction between a pair of adjacent telescoping shell segments.

Figure 12A:
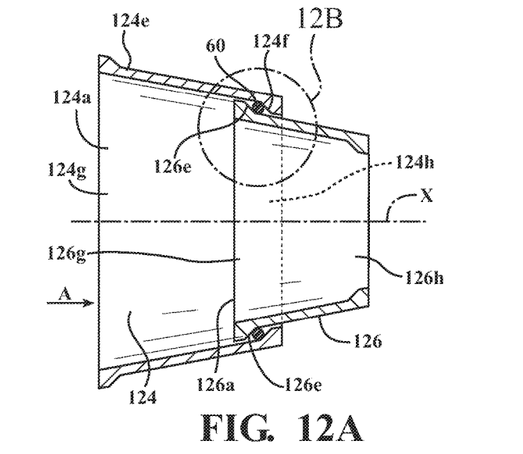
FIG. 12A is a schematic cross-sectional view showing a pair of adjacent telescoping intermediate shell segments in a deployed condition, and including an embodiment of a stiffening mechanism.
Figure 12B:
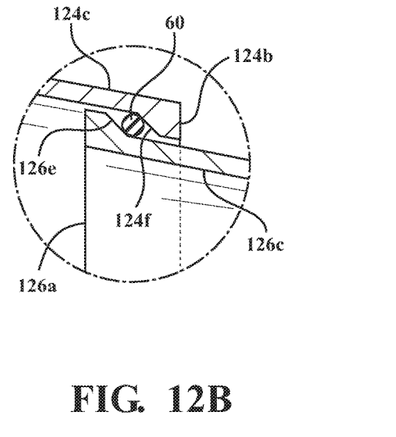
FIG. 12B is a magnified schematic cross-sectional view of portions of the shell segments shown in FIG. 12A.
Figure 13A:
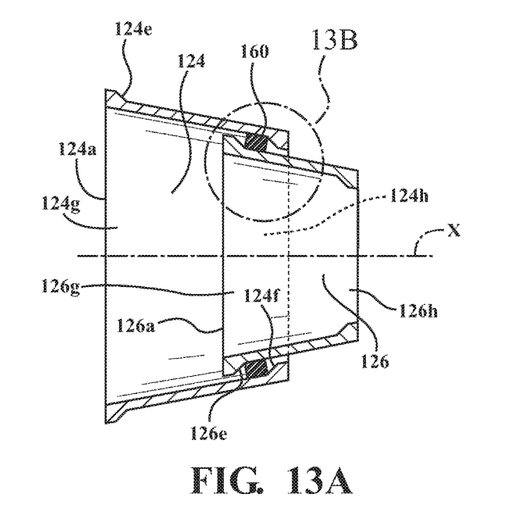
FIG. 13A is a schematic cross-sectional view showing a pair of adjacent telescoping intermediate shell segments in a deployed condition, and including another embodiment of a stiffening mechanism.
Figure 13B:
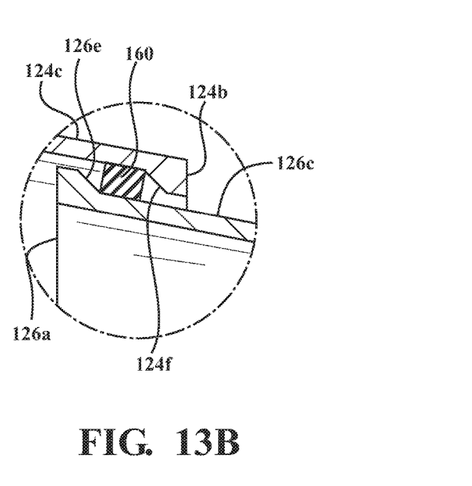
FIG. 13B is a magnified schematic cross-sectional view of portions of the shell segments shown in FIG. 13A.

Referring to FIGS. 12A and 12B, in an embodiment positioned between shell segments 124 and 126 of shell 120, the at least one stiffening mechanism may comprise at least one stiffening member 60 positioned between retention surface 124f formed along second end 124b of a first shell segment 124 of the pair of adjacent telescoping shell segments 124 and 126, and another retention surface 126e formed along a first end 126a of a second shell segment 126 of the pair of adjacent telescoping shell segments. The at least one stiffening member 60 may also contact wall portion(s) 126c of shell segment 126 and wall portion(s) 124c of shell segment 124. When the shell segment 126 moves rearwardly during deployment of the telescoping shell 120, the at least one stiffening member 60 is forced tightly against the surfaces of the adjacent shell segments 124 and 126 between which it is located. It has been found that incorporation of at least one stiffening member between opposed retention surfaces (such as retention surfaces 124f and 126e of FIGS. 12A and 12B) and between wall portions (such as wall portion(s) 124c and 126c of FIGS. 12A and 12B) of adjacent telescoping shell segments may increase the overall stiffness of the deployed shell at the junction between the adjacent shell segments, for example, by increasing the contact or bearing surface area between the adjacent shell segments and the stiffening member and/or by helping to absorb slack or assembly tolerances between the adjacent shell segments.

In the particular embodiment shown in FIGS. 12A and 12B, the at least one stiffening member 60 comprises at least one ring-shaped member. The ring-shaped member shown in FIGS. 12A and 12B has a circular cross-sectional shape. Alternatively, the ring-shaped member may have a rectangular cross-sectional shape (such as stiffening member 160 of FIGS. 13A and 13B), or another cross-sectional shape. Use of a rectangular cross-sectional shape may further increase the contact and bearing surface areas between the adjacent shell segments and the stiffening member, thereby further increasing the stiffness of the deployed shell at the segment junction.

In the particular shell embodiment 120 shown in FIG. 9, a stiffening member is positioned between wall portion(s) and opposed retention surfaces of each pair of adjacent telescoping shell segments of the shell 120. This may increase the effective overall stiffness of the entire telescoping shell 120 when the shell is deployed. For example, incorporation of the stiffening members may increase the resistance of the deployed shell 120 to forces applied by side impact loads and crosswinds (i.e., forces acting in directions F generally perpendicular to a direction in which the deployed shell 120 extends from the vehicle). Alternatively, a stiffening member may be applied to one or more selected joints formed between selected pairs of adjacent telescoping segments, to increase the stiffness of one or more selected portions of the deployed shell 120.

Referring again to FIGS. 12A and 12B, stiffening member 60 may be attached to an interior surface of a shell segment, such as along retention surface 124f. Alternatively, the stiffening member 60 may be attached to an exterior surface of a shell segment 126, such as along retention surface 126e. Either of these arrangements will pre-position and secure the stiffening member in position for contact between the opposing retention surfaces 126e and 124f when the shell 120 is deployed. Stiffening members may be attached to the shell segments using any suitable method, for example, adhesive application, welding, etc. Alternatively, the stiffening member 60 may be applied to a shell segment (such as segment 126 of FIG. 12A) along an exterior surface thereof so as to be movable along (or unfixed with respect to) the exterior surface of the shell segment. In this case, referring to FIG. 12A, as the shell segment 126 along which the stiffening member 60 is mounted deploys from the opening 124h of the adjacent shell segment 124 where it is stowed, the stiffening member 60 contacts the retention surface 124f on the second end of shell segment 124. Deployment motion of shell segment 126 from shell segment 124 continues until retention surface 126e abuts stiffening member 60. This prevents further motion of the shell segment 126 in the deployment direction and secures the stiffening member 60 between the opposing retention surfaces 124f and 126e.

The stiffening members 60, 160 may be formed from any material suitable for the purposes described herein. A material may be selected which resists compression forces applied by the shell segments surrounding the stiffening member, so that the rigidity of the shell 120 at the junctions between the shell segments may be enhanced. Suitable materials may include elastomerics, polymeric, and metallic materials. The various methods of positioning and/or securing the stiffening members as described above may apply to any telescoping segments (or pairs of segments) described herein.

Figure 14A:
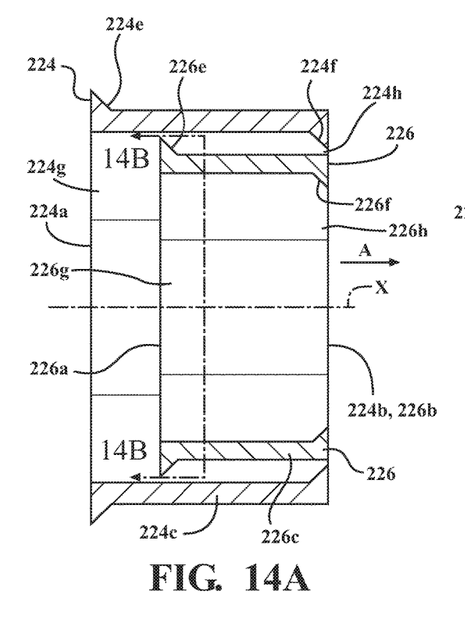
FIG. 14A is a schematic cross-sectional side view of an exemplary hexagonally-shaped intermediate shell segment residing within an adjacent similar shell segment.
Figure 14B:
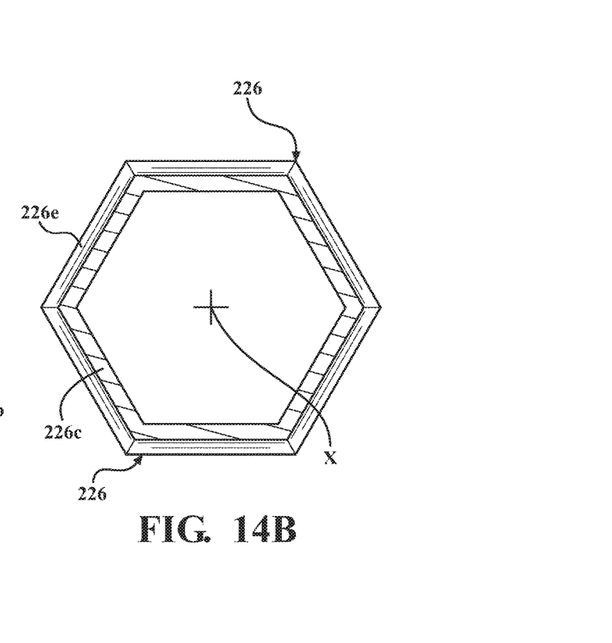
FIG. 14B is a schematic cross-sectional end view of the hexagonally-shaped shell segment shown in FIG. 14A.

The shell segments forming an embodiment of the telescoping shell may have any of a variety of alternative shapes. For example, the shell segments may have a hexagonal configuration as shown in FIGS. 14A and 14B. FIG. 14A is a schematic cross-sectional side view of an exemplary hexagonally-shaped intermediate shell segment 226 residing within an adjacent similar shell segment 224. FIG. 14B is a schematic cross-sectional end view of the shell segment 226 shown in FIG. 14A. Shell segments 224 and 226 may incorporate retention surfaces 224f, 226e similar to the retention surfaces shown in 10A and 10B. Retention surface 226e formed along the exterior of shell segment 226 may be structured to contact retention surface 224f formed along the interior of shell segment 224 during shell deployment, in the manner previously described. If desired, stiffening members as previously described may be positioned between the retention surfaces 226e and 224f, as previously described.

Figure 18A:
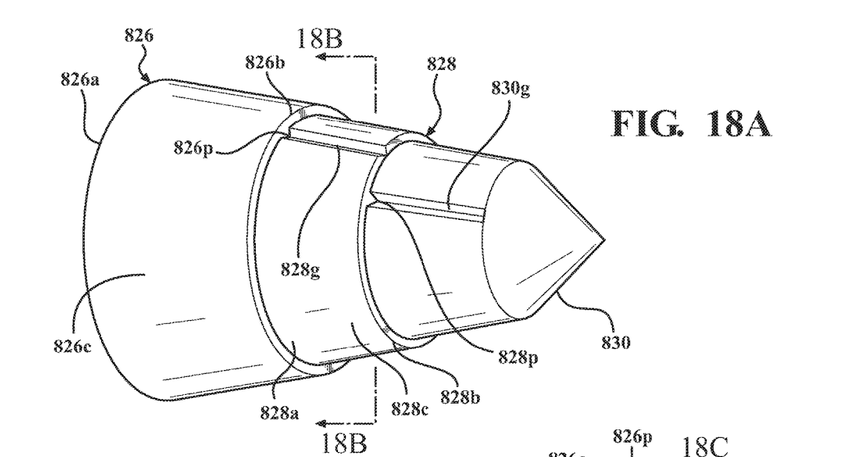
FIG. 18A shows a perspective view of a pair of deployed adjacent shell segments in accordance with another embodiment described herein.
Figures 18B, 18C:
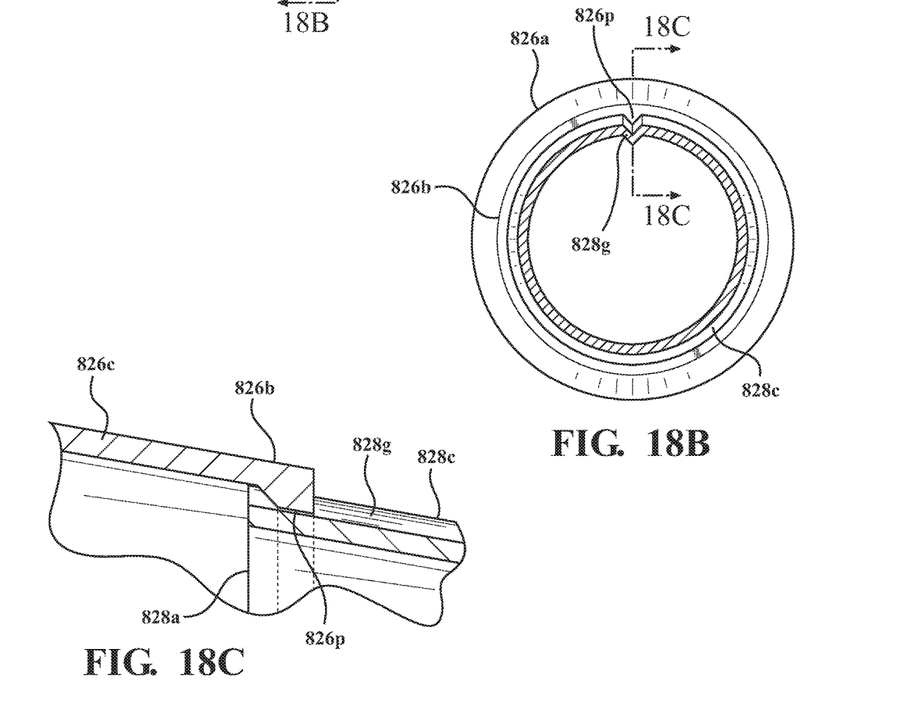
FIG. 18B is a cross-sectional end view of the shell segments shown in FIG. 18A.
FIG. 18C is a magnified cross sectional view of a portion of the embodiment shown in FIGS. 18A and 18B.

Referring to FIGS. 18A-18C, any of the connecting shell segments and the intermediate shell segments described herein may include a projection positioned near a second end of the shell segment and extending in a direction toward an interior of the shell segment. In addition, any shell segment extending from a shell segment incorporating the projection just described may include a complementary groove formed in an exterior surface thereof. The groove may be configured for receiving the projection therein when the adjacent shell segments are in both their retracted and extended conditions.

For example, FIG. 18A shows a perspective view of a pair of adjacent shell segments 826 and 828 structured similarly to shell segments 26 and 28 previously described, and shown in a deployed condition. FIG. 18B is a cross-sectional end view of the embodiment shown in FIG. 18A. FIG. 18C is a magnified cross-sectional side view of a portion of the embodiment shown in FIGS. 18A and 18B. Shell segment 826 has a first end 826a, a second end 826b opposite the first end 826a, and at least one wall portion 826c extending between and connecting first and second ends, as previously described. Shell segment 828 has a first end 828a, a second end 828b opposite the first end 828a, and at least one wall portion 828c extending between and connecting first and second ends, as previously described. In addition, a projection 826p is positioned at or near second end 826b of the shell segment 826 and extends in a direction toward an interior of the shell segment 826. Also, shell segment 828 extending from shell segment 826 includes a complementary groove 828g formed in an exterior surface thereof of the shell segment 828. Groove 828g is structured to receive projection 826p therein and may extend along the length of the shell segment 828. As the shell segment 828 extends from and retracts into shell segment 826, the projection 826p slides within groove 828g. Engagement between the projection 826p and the groove 828g during deployment and retraction of the shell acts to prevent rotation of the shell segments 826 and 828 with respect to each other.

FIG. 18A also shows an additional projection 828p incorporated into shell segment 828, and an additional groove 830g incorporated into shell segment 830 extending from shell segment 828. As seen in FIG. 18A, the projections (such as projections 826p and 828p) on adjacent shell segments may be angularly spaced apart from each other so as to prevent interference with each other during stowage of the shell. Similarly, the associated grooves (such as grooves 828g and 830g within which the projections slide may be angularly spaced apart from each other in accordance with the positioning of the associated projections.

Figure 15:
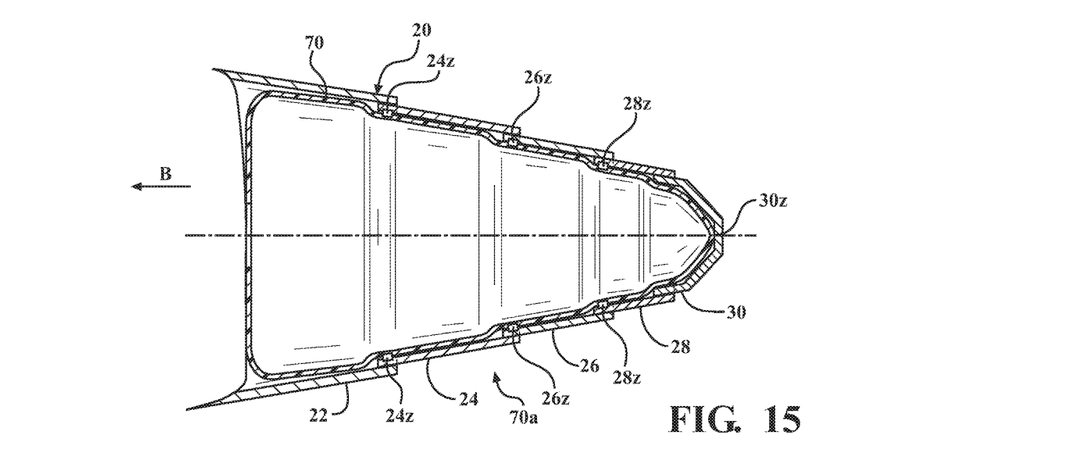
FIG. 15 is a schematic side cross-sectional view illustrating a telescoping shell in operative communication with a portion of an embodiment of an actuation mechanism operable to deploy the shell in a direction away from a vehicle.

FIG. 15 is a schematic diagram illustrating a telescoping shell 20 as described above in operative communication with a portion of an actuation mechanism (generally designated 510) operable to deploy the shell in a direction away from the vehicle 11. In combination, the actuation mechanism and the shell may form a deployable air drag reduction system 500 for a vehicle. Referring to FIG. 15, in certain embodiments, the actuation mechanism includes an inflatable bladder 70 operatively coupled to the telescoping shell 20. The inflatable bladder 70 is structured inflate inside the shell 20 to deploy the shell 20 when an interior of the bladder 70 is injected with a pressurized fluid. If desired, and as shown in FIG. 15, the bladder 70 may be fabricated so that, when inflated, it expands into the interior of the shell segments and assumes the same general shape as the interior volume of the deployed shell 20. In this arrangement, the bladder 70 may then apply pressure to the walls of the various shell segments when inflated, which may aid in further stiffening the shell structure against lateral loading.

In addition, portions of the bladder 70 may be attached to the shell segments 24, 26, 28 and 30 at attachment locations, such as 24z, 26z, 28z near the respective first ends 24a, 26a and 28a of the shell segments, and/or at any other locations of the shell 20 suitable for facilitating deployment and retraction of the shell. In addition, bladder 70 may be attached to end shell segment 30 at a location 30z near a rearmost portion of the shell segment. Each shell segment may be attached to the bladder 70 at more than one location. These attachments enable the shell 20 to be retracted by forced evacuation of the inflated bladder 70. That is, as the bladder is evacuated, the attachments 24z, 26z, 28z, and 30z force each of the shell segments 24, 26, 28 and 30 in a direction "B" opposite direction "A", toward the connecting shell segment 22 and into their respective retracted locations with an adjacent shell segment. The portions of the bladder may be attached to associated shell segments using any suitable method or methods, for example, adhesives, mechanical fasteners, or any other method.

Figure 16A:
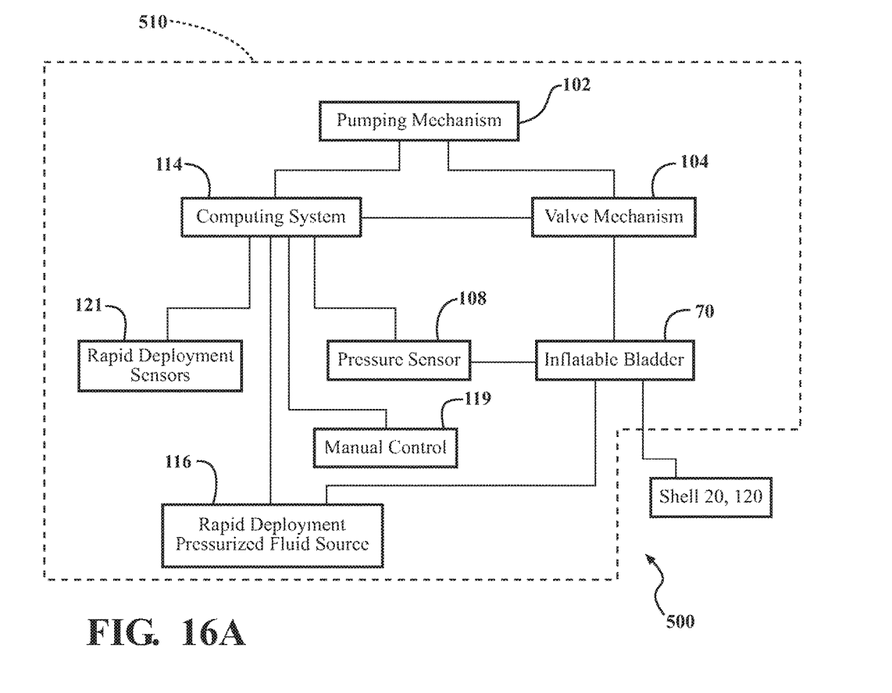
FIG. 16A is a schematic view of one embodiment of a deployable air drag reduction system configured for deploying a shell as described herein.

FIG. 16A is a schematic view of one possible embodiment of a deployable air drag reduction system 500 configured for deploying a shell such as shell 20 previously described. The system embodiment shown in FIG. 16A includes an embodiment of the shell 20, 120 described herein and actuation mechanism 510. The actuation mechanism may include a computing system 114, a pumping mechanism 102, a valve mechanism 104, an inflatable bladder (such as bladder 70 previously described), a manual control mechanism 119, and a pressure sensor 108. Other elements may be included if required or desired. For example, it may be determined that deployment of the shell 20 will decrease estimated aerodynamic drag by a certain percentage when the vehicle road speed reaches a predetermined threshold level. The computing system 114 may be configured to automatically operate the deployable air drag reduction system 500 to deploy the shell 20 when the vehicle road speed reaches or exceeds the threshold. In addition, the computing system 114 may be configured to automatically operate the deployable air drag reduction system 500 to retract the shell 20 when the vehicle road speed falls below the threshold.

Pumping mechanism 102 may be operatively coupled to computing system 114 and valve mechanism 104. Pumping mechanism 102 may be configured for pumping an inflation fluid into bladder 70, for inflating the bladder 70 to deploy the shell 20. Pumping mechanism 102 may also be configured for evacuating or pumping fluid out of an inflated bladder, to retract the deployed shell 20 back into a stowed condition. The pumping direction of the pumping mechanism 102 may be controlled by the computing system as needed.

Valve mechanism 104 may be operatively coupled to the computing system 114, the pumping mechanism 102, and the bladder 70. Valve mechanism 104 may be operable by the computing system 114 to regulate the directions and/or amounts or fluid flow to and from the bladder 70. The valve mechanism 104 may be closable to seal the inflated bladder 70 and openable to release or exhaust inflation fluid from the bladder, as required. A pressure sensor 108 may be operatively coupled to the computing system 114 and the bladder 70. Pressure sensor 108 may be operable to detect a pressure within the bladder 70 when the shell is deployed, and to communicate the bladder pressure to the computing system 114. If the pressure falls below a predetermined threshold, the computing system 114 may operate the pumping mechanism 102 and the valve mechanism to add inflation fluid to the bladder interior. This aids in maintaining the bladder pressure at a nominal level, which aids in maintaining the full extension and rigidity of the shell 20. If the bladder pressure exceeds a predetermined limit, the computing system 114 may operate a pressure relief valve (not shown), or a relief valve may automatically trigger to relieve the excess bladder pressure.

A manual control mechanism 119 may be provided for enabling a driver or other vehicle occupant to control deployment and/or retraction of the shell 20 as desired. The manual control mechanism 119 may be operatively coupled to the computing system 114 so that when the manual control mechanism is actuated, the computing system automatically generates the commands needed to execute the desired manual control function. If desired, manual control mechanism 119 may be configured to either override or supplement automatic control of the deployment and/or retraction of the shell by computing system 114. Control functions for shell operation (deployment, deployment maintenance, and retraction) may be implemented by an existing vehicle computing system such as a vehicle control module, for example. Alternatively, operation of the shell 20 may be implemented by a computing system dedicated to that purpose.

Figure 16B:
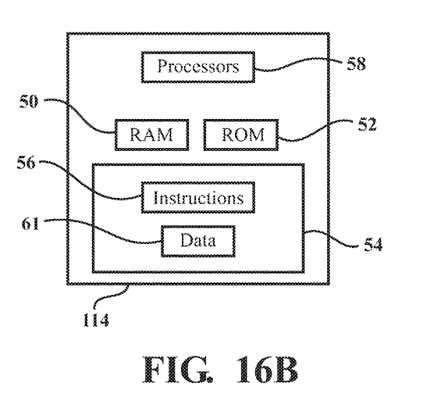
FIG. 16B is a schematic block diagram of an embodiment of a computing system configured for controlling automatic deployment and retraction of a deployable shell in accordance with an embodiment described herein.

FIG. 16B is a schematic block diagram of a computing system 114 configured for controlling automatic deployment, deployment maintenance, and retraction of the shell. Referring to FIG. 16B, the computing system 114 may include one or more processors 58 (which could include at least one microprocessor) for controlling overall operation of the computing system 114 and associated components, and which execute instructions stored in a non-transitory computer readable medium, such as memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other.

In some embodiments, the computing system 114 may include RAM 50, ROM 52, and/or any other suitable form of computer-readable memory 54. A computer-readable storage or memory includes any medium that participates in providing data (e.g., instructions), which may be read by a computer. The memory or memories can be a component of the computing system 114, or the memory or memories can be operatively coupled to the computing system 114 for use thereby. The memory 54 may contain data 61 and/or instructions 56 (e.g., program logic) executable by the processor(s) 58 to execute various functions, including those described above in connection with deployment, deployment maintenance, and retraction of the shell 20 as described above. The memory 54 may contain additional instructions as well, including instructions to transmit data to, receive data from, interact with, or control one or more of the vehicle systems and/or components described herein (for example, pressure sensor 108 and/or pumping mechanism 102). The computing system 114 may be configured to execute instructions stored in the memory to control deployment and retraction of the shell 20 as described herein, based on various criteria. The control criteria may be user-defined and/or defined by an OEM of the shell 20 or vehicle 11. In a particular embodiment, the computing system 114 may be configured to automatically deploy the shell 20 when the vehicle road speed reaches or exceeds a predetermined threshold. The computing system may also be configured to retract the shell automatically when the vehicle road speed falls below the predetermined threshold.

In certain embodiments, the air-drag reduction system 500 shown in FIG. 16A may be configured to rapidly deploy the shell 20 as a vehicle safety measure. For example, the air drag reduction system 500 may also include rapid deployment sensors 121 and a rapid-deployment pressurized fluid source 116. The rapid deployment sensors 121 may be operatively coupled to the computing system 114 and may be configured for detecting the presence of another vehicle (not shown) rapidly approaching the vehicle 11 from a rear of the vehicle 11. The rapid deployment sensors 121 may be existing vehicle sensors (such as radar) which are already tasked for detecting approaching vehicles or determining the proximity of other vehicles to the vehicle 11. Alternatively, the sensors 121 may be dedicated sensors.

Rapid-deployment pressurized fluid source 116 may be operatively coupled to the computing system 114 and to bladder 70. The rapid-deployment pressurized fluid source 116 may be any fluid source capable of rapidly injecting inflation gas into the bladder 70 on demand, in a quantity and within a time frame sufficient to inflate the bladder 70 and deploy the shell 20 prior to another vehicle approaching to within a predetermined distance of the ego-vehicle. This distance may be, for example, a distance required to fully deploy the shell 20 behind the ego-vehicle. In this manner, the shell may be more rapidly deployed than when using the pumping mechanism 102. Examples of suitable fluid sources include airbag inflators configured to generate inflation gas, and pressurized gas canisters. Any other suitable source of pressurized gas may be used. When deployed in this manner, the shell 20 may act as a safety device which may aid in absorbing collision forces between the vehicle 11 and the approaching vehicle.

Figure 17:
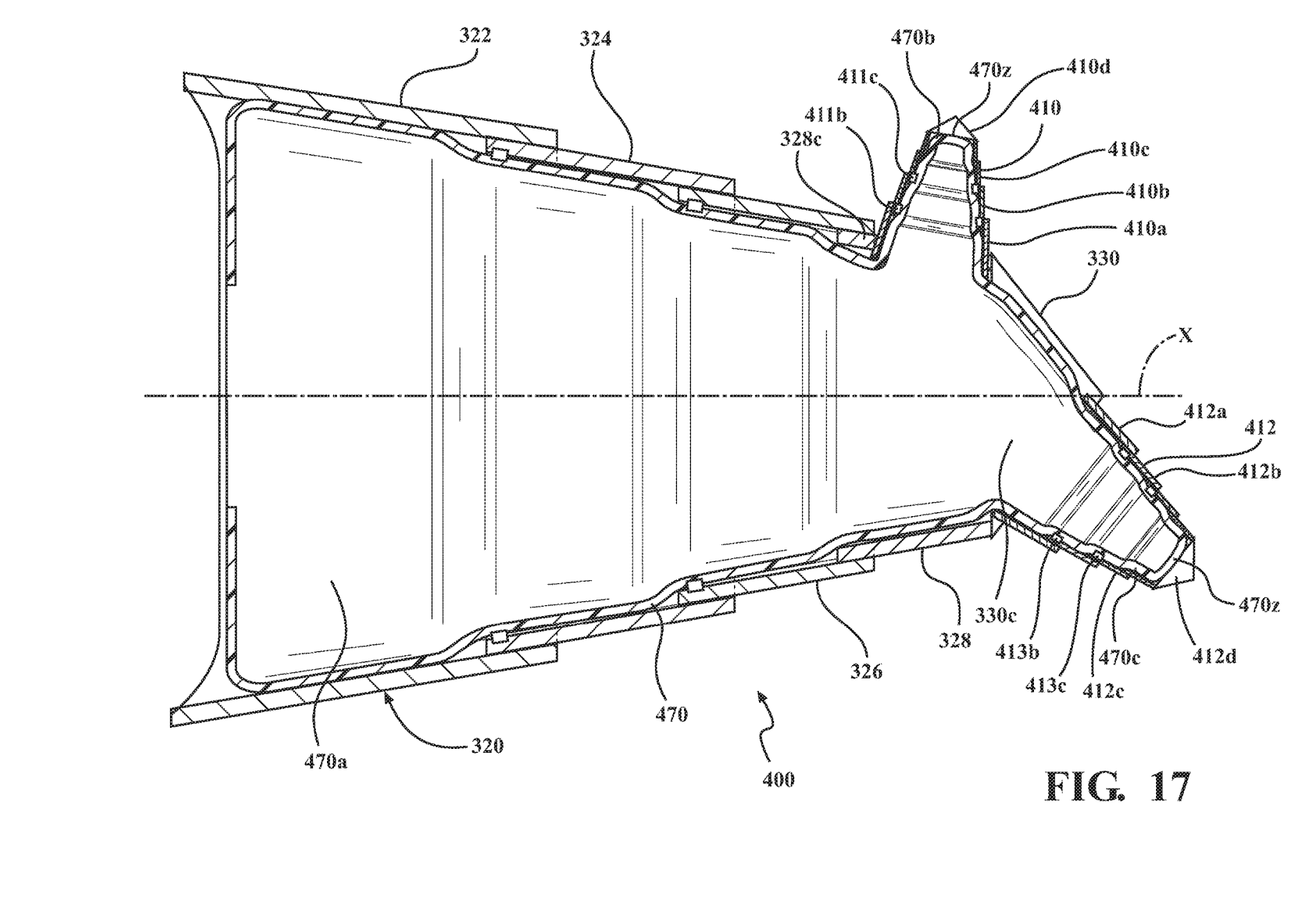
FIG. 17 is a schematic side view of a portion of a deployable air-drag reduction mechanism in accordance with another embodiment described herein.

FIG. 17 shows a schematic side view of a portion of a deployable air-drag reduction mechanism 400 in accordance with another embodiment. This embodiment may include all of the air-drag reduction mechanism elements shown in FIG. 15, some of which may not be shown in FIG. 17. This embodiment also incorporates a shell 320 structured largely in accordance with one of the shell embodiments 20, 120 previously described to include a plurality of telescoping shell segments. For example, in the embodiment shown, shell 320 includes a connecting shell segment 322, intermediate shell segments 324, 326, and 328, and an end shell segment 330. In addition, the shell 320 includes at least one additional shell structured to be deployable from a shell segment of the plurality of telescoping shell segments of the shell 320. In the embodiment shown, the shell 320 includes a first additional shell 410 and a second additional shell 412 projecting from the shell 320. First additional shell 410 projects from a wall portion 328c of intermediate shell segment 328, and second additional shell 412 projects from a wall portion 330c of end shell segment 330. Each of additional shells 410 and 412 may include or be formed from a plurality of telescoping shell segments, in the same manner as either of shells 20 and 120 previously described. In the example shown, shell 410 is formed from shell segments 410a, 410b, 410c and 410d. Shell 412 is formed from shell segments 412a, 412b, 412c and 412d.

For purposes of deploying the main shell 320 and additional shells 410 and 412, an inflatable bladder 470 may be employed as previously described. The bladder 470 may be fabricated to produce the shape shown in FIG. 17 when inflated. Thus, the bladder 470 may include a main portion 470a structured to deploy the main shell 320. The bladder 470 may also include first and second branch portions 470b and 470c branching off of the main portion 470a and structured to deploy additional shells 410 and 412, respectively. In addition, bladder branch portion 470b may be attached to additional shell 410 at locations 411b and 411c along first ends of the shell segments 410b and 410c of the shells forming additional shell 410, and/or at any other locations of the additional shell 410 suitable for facilitating deployment and retraction of the shell 410. Also, bladder branch portion 470b may be attached to additional shell segment 410d at a location 410z proximate the end of shell segment 410d, as described in relation to the embodiment shown in FIG. 15. In addition, bladder branch portion 470c may be attached to additional shell 412 at locations 413b and 413c along first ends of the shell segments 412b and 412c of the shells forming additional shell 412, and/or at any other locations of the additional shell 412 suitable for facilitating deployment and retraction of the shell 412. Also, bladder branch portion 470c may be attached to additional shell segment 412d at a location 412z proximate the end of shell segment 410d, as described in relation to the embodiment shown in FIG. 15. The ability to provide extension or branching shells projecting from portions of a main shell enables increased flexibility in adjusting the aerodynamics of the air-drag reduction mechanism to the requirements of particular applications.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An air-drag reduction mechanism for a vehicle, the mechanism comprising a shell structured to be deployable in a deployment direction away from a vehicle, the shell including a plurality of telescoping shell segments, wherein a shell segment of the plurality of telescoping shell segments includes a first end, a second end opposite the first end, and at least one wall portion extending between and connecting the first and second ends, the first end, the second end, and the at least one wall portion defining an interior of the shell segment, and wherein the shell segment second end has a retention surface residing in the interior of the shell segment and extending from the at least one wall portion of the shell segment at an angle with respect to the at least one wall portion of the shell segment and in a direction toward the interior of the shell segment, wherein another shell segment of the plurality of telescoping shell segments has a first end, a second end, and at least one wall portion extending between and connecting the other shell segment first and second ends, the first end, second end, and the at least one wall portion of the other shell segment defining an interior of the other shell segment, wherein the other shell segment first end has a retention surface residing on an exterior of the other shell segment and extending from the at least one wall portion of the other shell segment at an angle with respect to the at least one wall portion of the other shell segment and in a direction away from the interior of the other shell segment, and wherein the other shell segment first end retention surface is positioned within the interior of the shell segment of the plurality of telescoping shell segments and is structured to contact the second end retention surface of the shell segment of the plurality of telescoping shell segments when the shell is in a deployed condition, to prevent further movement of the other shell segment in the deployment direction.

2. The air-drag reduction mechanism of claim 1 wherein the shell is structured to be connected to and deployable from a rear end of the vehicle.

3. The air-drag reduction mechanism of claim 1 wherein a shell segment of the plurality of telescoping shell segments is a connecting shell segment structured for attachment to the vehicle, to connect the shell to the vehicle.

4. The air-drag reduction mechanism of claim 3 wherein a portion of the connecting shell segment is structured to follow a contour of a portion of a vehicle to which it is to be attached.

5. The air-drag reduction mechanism of claim 3 further comprising a plurality of intermediate shell segments structured to be deployable from the connecting shell segment, and wherein each shell segment of the plurality of intermediate shell segments is frusto-conical in shape.

6. The air-drag reduction mechanism of claim 1 further comprising at least one stiffening mechanism structured for increasing resistance to deflection of the shell when the shell is in a deployed condition, the at least one stiffening mechanism being positioned at a junction formed between a pair of adjacent telescoping shell segments of the plurality of telescoping shell segments.

7. The air-drag reduction mechanism of claim 6 wherein the at least one stiffening mechanism comprises at least one stiffening member positioned between a surface formed on a first shell segment of the pair of adjacent telescoping shell segments, and an opposed surface formed on a second shell segment of the pair of adjacent telescoping shell segments.

8. The air-drag reduction mechanism of claim 7 wherein the at least one stiffening member has one of a circular cross-sectional shape and a rectangular cross-sectional shape.

9. The air-drag reduction mechanism of claim 1 wherein the shell is structured to be deployable along a first deployment axis, wherein the air-drag reduction mechanism further comprises at least one additional shell formed from a plurality of telescoping shell segments and structured to be deployable from a shell segment of the plurality of telescoping shell segments of the shell, and wherein the at least one additional shell is structured to be deployable along a second deployment axis different from the first deployment axis.

10. The air-drag reduction mechanism of claim 9 wherein the at least one additional shell includes an additional plurality of telescoping shell segments.

11. The air-drag reduction mechanism of claim 1 wherein the shell segment first end has a retention surface residing on an exterior of the shell segment and extending from the at least one wall portion of the shell segment at an angle with respect to the at least one wall portion of the shell segment and in a direction away from the interior of the shell segment.

12. The air-drag reduction mechanism of claim 1 wherein the shell segment second end retention surface extends from the at least one wall portion of the shell segment in a direction toward the interior of the shell segment so as to form an obtuse angle with the at least one wall portion of the shell segment, and wherein the other shell segment first end retention surface extends from the at least one wall portion of the other shell segment in a direction away from the interior of the other shell segment so as to form an obtuse angle with the at least one wall portion of the other shell segment.

* * * * *